Sept. 30, 1958 H. REDLICH 2,854,527

MAGNETIC SOUND RECORDING AND REPRODUCING APPARATUS

Filed May 6, 1955

INVENTOR:
HORST REDLICH
BY [signature]
PATENT AGENT 2,854,527
Patented Sept. 30, 1958

2,854,527

MAGNETIC SOUND RECORDING AND REPRODUCING APPARATUS

Horst Redlich, Berlin-Tempelhof, Germany, assignor to Telefunken G. m. b. H., Berlin, Germany Application May 6, 1955, Serial No. 506,636
In Germany December 13, 1948

Public Law 619, August 23, 1954
Patent expires December 13, 1968

4 Claims. (Cl. 179—100.2)

This invention relates to a driving mechanism for a magnetic sound recording and reproducing apparatus in which a magnetic tape is used as carrier for the intelligence to be recorded.

Magnetic sound recording and reproducing apparatus with magnetic tape as intelligence carrier has been known in which the tape has two sound tracks, one being used for recording or scanning during the forward movement of the tape and the other during reverse movement. As a result of this, the usefulness of the tape was doubled and the otherwise occurring time loss for the return travel of the tape avoided.

In the known apparatus, the tape was driven by means of a driving roller placed asymmetrically in relation to the magnetic heads. Such arrangement proved disadvantageous, because difficulties occurred in the guiding of the tape pulled by difference forces during the forward and the reverse run. As a result of this, the engagement of the tape with the heads became uncertain.

It is an object of this invention to completely avoid this disadvantage in magnetic sound recording and reproducing apparatus having two separate heads for recording on and producing from magnetic sound tracks during the forward and reverse run of the carrier of this sound track.

It is a further object of the present invention to arrange the driving roller symmetrically between the two magnetic heads. Such arrangement assures that the pull on the tape is the same during its forward run and during its reverse run, so that the tape will always remain in proper engagement with these heads.

Figure 1:
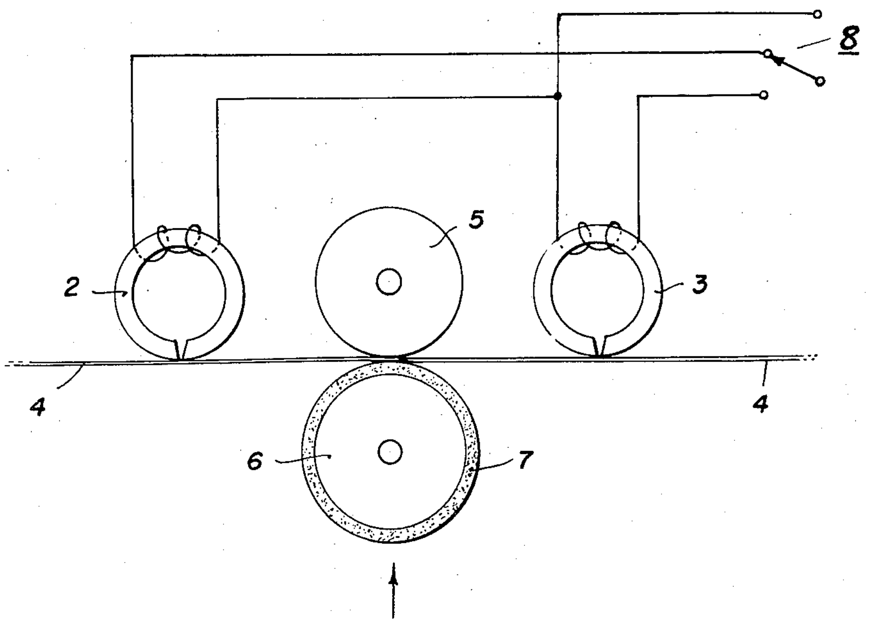
Figure 2:
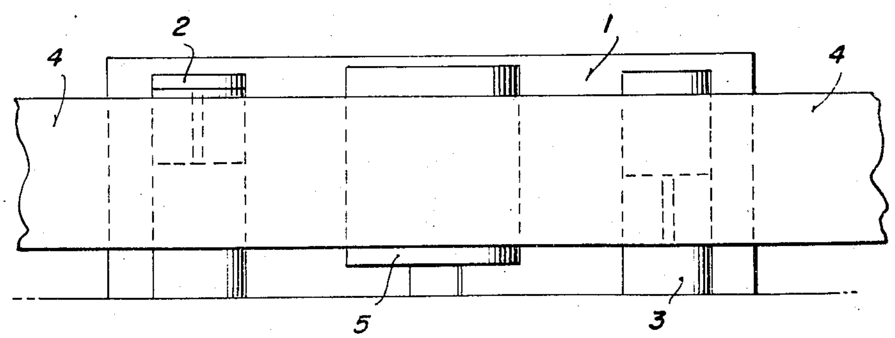

A diagrammatic top view or plan of an embodiment of the invention is shown in Fig. 1 of the drawing by way of example. Fig. 2 illustrates a side view of the device indicated in Fig. 1, with the pressure roller removed.

As shown in Fig. 2, magnetic heads 2 and 3 are held in a supporting member or holder 1 mounted on a suitable base. One of these magnetic heads serves as recording head and after changing the electric connections with the circuit by means of a switch 8 (see Figure 1) as pick-up head during the forward run of a magnetic tape 4, while the other serves in the same manner as recording head or pick-up head during the reverse run. The tape 4 carries two magnetic sound tracks. A driving roller 5 is provided between the heads 2 and 3. As shown in Figs. 1 and 2, this roller 5 is positioned at equal distances between the heads 2 and 3, thus assuring the same operating conditions in the two driving directions.

According to Fig. 1, a roller 6 with a rubber or other resilient lining 7 on its circumference is slightly pressed, for example by spring means, not shown, against the tape 4 at a place opposite the drive roller 5 of the tape to produce the necessary frictional engagement between the tape and the roller 5.

Although in accordance with the provisions of the patent statues this invention is described as embodied in concrete forms and the principle of the invention has been explained together with the best modes in which is now contemplated applying that principle, it will be understood that the elements, combinations and circuits shown and described are merely illustrative and that the invention is not limited thereto, since alterations and modifications will readily suggest themselves to persons skilled in the art without departing from the true spirit of the present invention or from the scope of the annexed claims.

I claim:

1. In a sound recording and reproducing apparatus of the type described in which a magnetic tape is used as carrier for the intelligence to be recorded, said tape having two sound tracks, two stationary magnetic sound recording and reproducing heads spaced from one another at a distance along the path of travel of said tape and each being respectively mounted adjacent one of said sound tracks, a circuit means to connect said heads to said apparatus, switching means associated with said circuit means to selectively insert the one or the other of said heads in said circuit means for recording or reproducing of intelligence on or from one of said tracks, means to guide said tape along and in contact with said heads, and selectively reversible driving means for said tape frictionally engaging the same at the center between said magnetic heads.

2. In a sound recording and reproducing apparatus according to claim 1, said driving means including a driven roller engaging one side of said tape and a spring pressed idle roller at the opposite side of said tape applying a slight pressure to said tape at the place of engagement between the latter and said driven roller, said idle roller having a resilient surface at its circumference.

3. In a sound recording and reproducing apparatus according to claim 2, said driven roller engaging that side of said tape which is engaged by said magnetic heads.

4. In a sound recording and reproducing apparatus according to claim 2, said magnetic heads and said driven roller being aligned so that said tape engages said heads and said elements along a substantially straight line.

References Cited in the file of this patent

UNITED STATES PATENTS

| | | |
|---|---|---|
| 2,297,242 | Pohlmann | Sept. 29, 1942 |
| 2,428,002 | Barrett | Sept. 30, 1947 |
| 2,686,845 | Reed | Aug. 17, 1954 |